Figure 1:
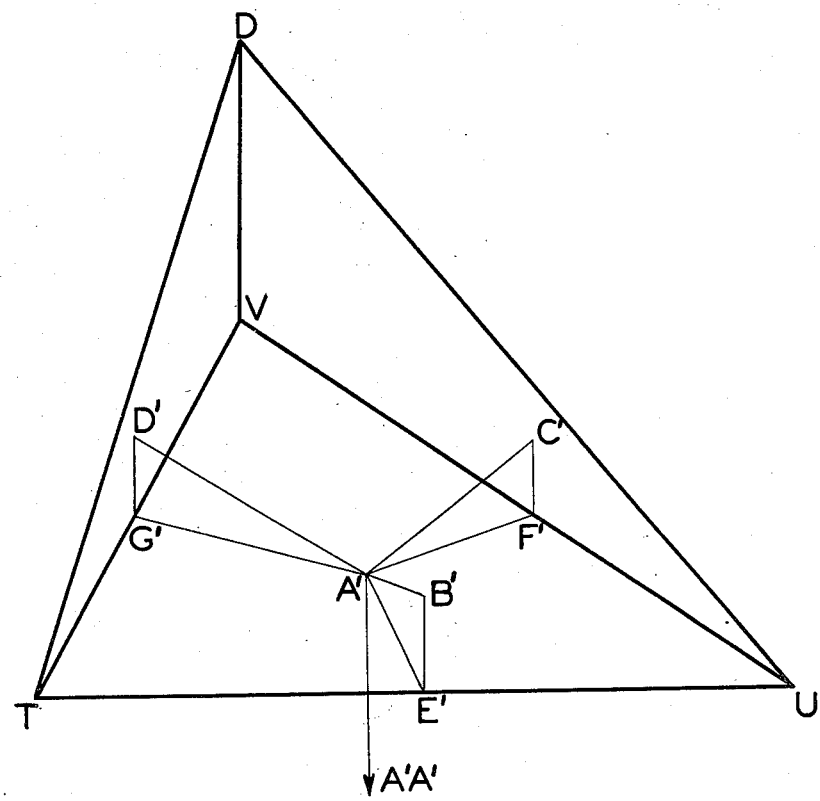

FIG. I.

April 29, 1952　　　M. DE GROOTE ET AL　　　2,594,542
PROCESS FOR BREAKING PETROLEUM EMULSIONS
Filed Dec. 22, 1949　　　　　　　　　　4 Sheets-Sheet 4
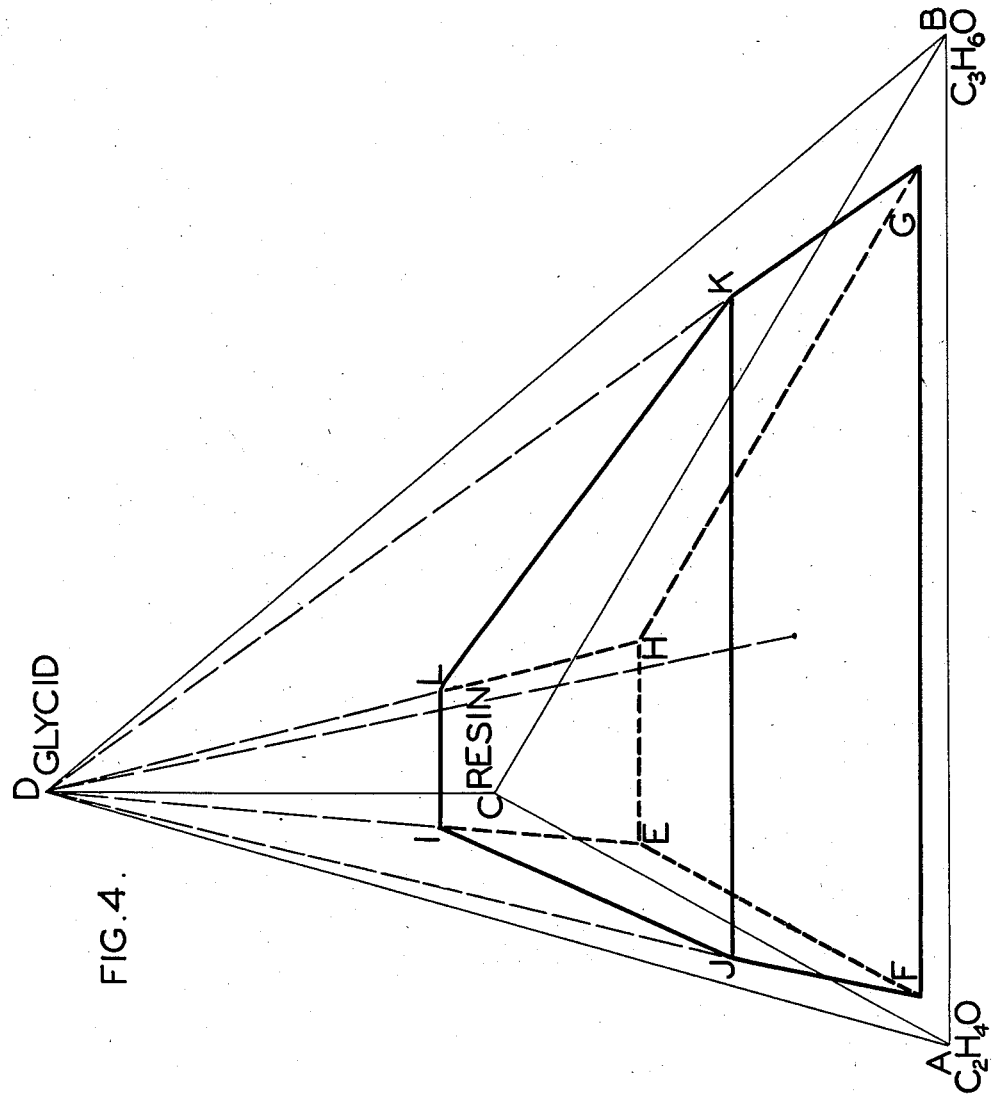
INVENTORS.

Patented Apr. 29, 1952

2,594,542

UNITED STATES PATENT OFFICE 2,594,542

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware Application December 22, 1949, Serial No. 134,581

6 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is our companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See our copending application, Serial No. 134,582, filed December 22, 1949.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present process is concerned with the breaking of petroleum emulsions by means of certain glycol ethers of phenol-acetylene resins, phenol-acetylene aldehyde resins, and phenol-aldehyde acetylene resins, as hereinafter described, and particularly in the form of cogeneric mixtures, as hereinafter described. These products are obtained by treatment of phenol-acetylene resins, phenol-acetylene aldehyde resins, and phenol-aldehyde acetylene resins with glycide, ethylene oxide and propylene oxide within the limits and manner hereinafter specified.

For example, we have discovered if one treats 12.5 parts by weight of an amylphenol acetylene resin with 8.4 parts by weight of propylene oxide and then with 6.5 parts by weight of ethylene oxide and 2.5 parts of glycid so as to yield a cogeneric mixture of glycol ethers, that such mixture, or similar mixtures, have unusual properties provided that the composition lies within a certain range as hereinafter specified.

In subsequent paragraphs from time to time reference is made to "compounds or cogeneric mixtures." At first glance it may appear that such language is indefinite, and perhaps contradictory. It is the intention at the moment only to point out that there is no inconsistency in such description and that subsequently there will be a complete explanation of why such designation is entirely proper.

As has been pointed out previously the present invention is concerned with certain reaction products or cogeneric mixtures obtained from four reactants or components combined in certain specific proportions as hereinafter described in detail. There is no difficulty in setting forth in graphic form a somewhat similar mixture obtained from three components instead of four, i. e., from suitable phenol-acetylene resins, phenol-acetylene aldehyde resins, and phenol-aldehyde acetylene resins, and ethylene oxide and propylene oxide as distinguished from a quaternary mixture employing the same three reactants and also glycide in addition.

Our copending applications, Serial Nos. 129,709 and 129,710, filed November 28, 1949, of which the former is now Patent 2,574,543, patented November 13, 1951, described tertiary mixtures using the conventional triangular graph. The transition from a triangular graph to what would normally be a space model (a regular tetrahedron) followed by subsequent modification so as to transform a three-dimensional model within certain limitations to a two-dimensional plane, presents a certain amount of detailed text and for this reason what is said subsequently will appear in certain parts or divisions, as follows:

Part 1 is concerned with the importance of glycide in effecting the structure of the derivatives, and the method of presentation herein employed with reference to Figures 1, 2, 3 and 4.

Part 2 is concerned with the preparation of suitable phenol-acetylene, phenol-acetylene aldehyde and phenol-aldehyde acetylene resins and the formation of oxyalkylated products therefrom using ethylene oxide and propylene oxide and includes a disclosure of this subject matter in this application by reference to Patent 2,574,543, which describes such tertiary-component products in detail and Patent 2,560,333, patented July 10, 1951, which describes in detail the preparation of suitable resins.

Part 3 is concerned with the preparation of the compounds employing four components or four reactants and in its simplest form perhaps obtainable by treating the tertiary mixtures of Part 2 preceding with glycide within the range hereinafter specified, i. e., that the final reaction product, or cogeneric mixtures, contain at least 2% and not more than 25% of glycide.

Part 4 consists of tables in which the limiting values are set forth in detail in tabular form so that the invention is set forth with particularity by this particular means without necessary reference to the figures. Obviously, of course, such tables could not suitably be incorporated in the claims, and such tables represent the outside or limiting values only and do not include the intermediate values. This is the reason that the claims refer to the figures.

Part 5 is concerned with the use of the cogeneric mixtures or reaction products for demulsification.

PART 1

The present invention is concerned with a cogeneric mixture which is the end product of a reaction or reactions involving 4 reactants. Assuming completeness of reaction and based on a mathematical average, the final product is characterized most conveniently in terms of the 4 component reactants. This phase of the invention is described elsewhere in greater detail.

In representing a mixture or an end product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides. Such representation is employed, for example, in our co-pending applications, Serial Nos. 129,709 and 129,710, filed November 28, 1949.

Chemists and physicists ordinarily characterize a 4-component system by using a solid, i. e., a regular tetrahedron. In this particular presentation each point or apex represents 100% of each of the 4 components, each of the 6 edges represents a line or binary mixture of the 2 components represented by the apexes or points at the end of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point within the regular tetrahedron one has definitely characterized and specified a 4-component mixture in which the 4 components add up to 100%.

In accompanying Figure 1 an attempt is made to illustrate this system of representation visibly in a plane surface. For sake of convenience one need only consider a regular tetrahedron resting on one face or triangular surface. If somewhere towards the middle of such tetrahedron one places a plane parallel to the base of the tetrahedron one again obtains an equilateral triangle which, of course, is reduced in size compared with the equilateral triangle which is the bottom of the regular tetrahedron. In Figure 1 the tetrahedron may be considered as formed by some transparent material and for convenience the new tetrahedron formed by the passage of the horizontal plane is, of course, a regular tetrahedron also. For convenience, one can consider that he is looking directly at this tetrahedron which is shown somewhat distorted for purposes of convenience, and in the smaller regular tetrahedron the apexes are T, U, V and D. The lines are TU, VU, TV and VD. The four equilateral triangles are TVD, UVD, TUV and TUD. Bearing in mind that this tetrahedron is just the upper part of what is assumed as being part of a larger tetrahedron and not showing, it is assumed for purpose of illustration that a point has been selected within this larger tetrahedron to indicate a specific mixture composed of 4 components. For convenience, the point is taken as A'. If from A' perpendiculars are elected to each of the four planes then there are designated at least three of them by lines which are shown and indicated as follows: A'B', A'C', A'D'. The fourth perpendicular goes from A' to the point in the plane beneath which is the assumed base of the original larger regular tetrahedron. Since the larger tetrahedron is not shown for the reason that it would only add confusion, this perpendicular is indicated simply by the line A'—A'A'.

Figure 2:
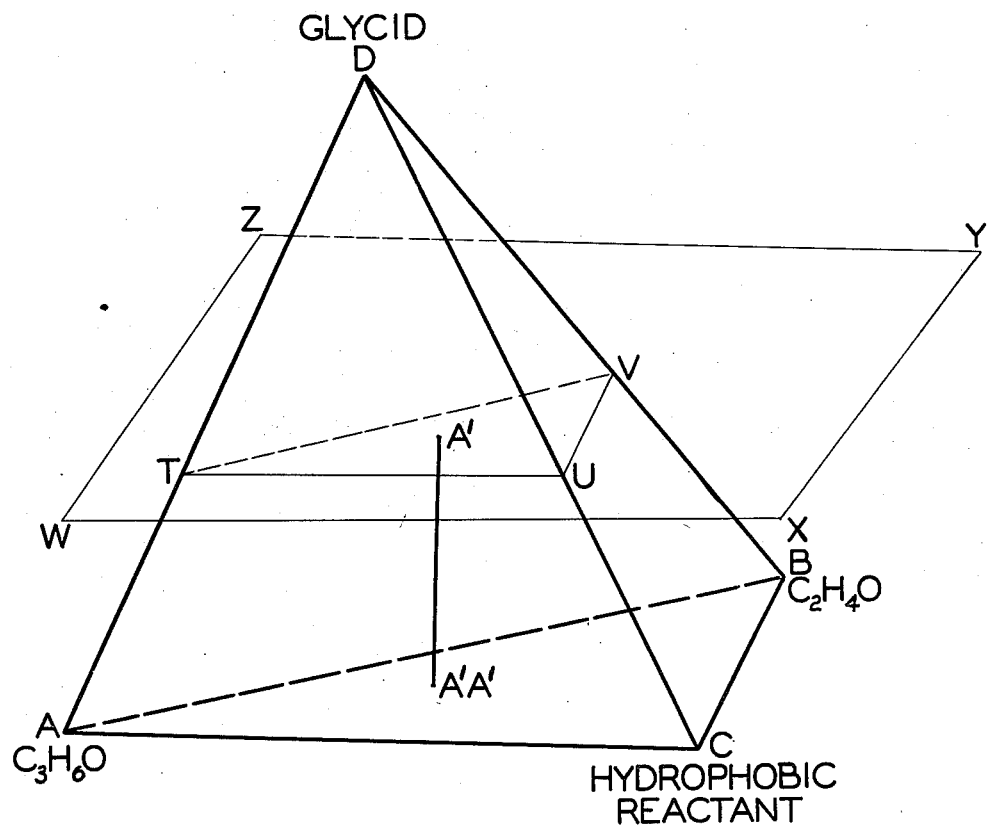

What has been said previously is illustrated in a slightly different aspect actually showing both the large tetrahedron and the plane in Figure 2. In this instance again the regular tetrahedron must be presented in a somewhat distorted aspect in order to show what is desired. The present invention is concerned with a cogeneric mixture derived from 4 components, to wit, ethylene oxide, propylene oxide, glycide, and hydrophobic reactant which is susceptible to reaction with the 3 enumerated alkylene oxides. These 4 components or initial reactants represent the 4 points or apexes of the regular tetrahedron and it will be noted that in this presentation the 4 apexes are marked A, B, C, and D. A represents 100% of propylene oxide, B represents 100% of ethylene oxide, D represents 100% of glycide and C represents 100% of hydrophobic reactant.

Referring momentarily to what has been said in regard to Figure 1 it will be noted that a perpendicular which is comparable is shown as a line connecting point A with point A'A'. More important, however, is this fact, that when a plane is placed parallel to the base such plane of necessity has the same configuration as the base. If one selected some particular figure in the base, for instance a triangle, a square, a rectangle, a pentagon, or the like, and drew lines from the corners or apexes of such plane figure in the base, to the top apex D, then that same figure but in a reduced size would appear in the intersecting plane TUV shown in this particular figure. TUV is the equilateral triangle furnished by the intersecting plane WXYZ which intersects the regular tetrahedron parallel to the base.

Figure 3:
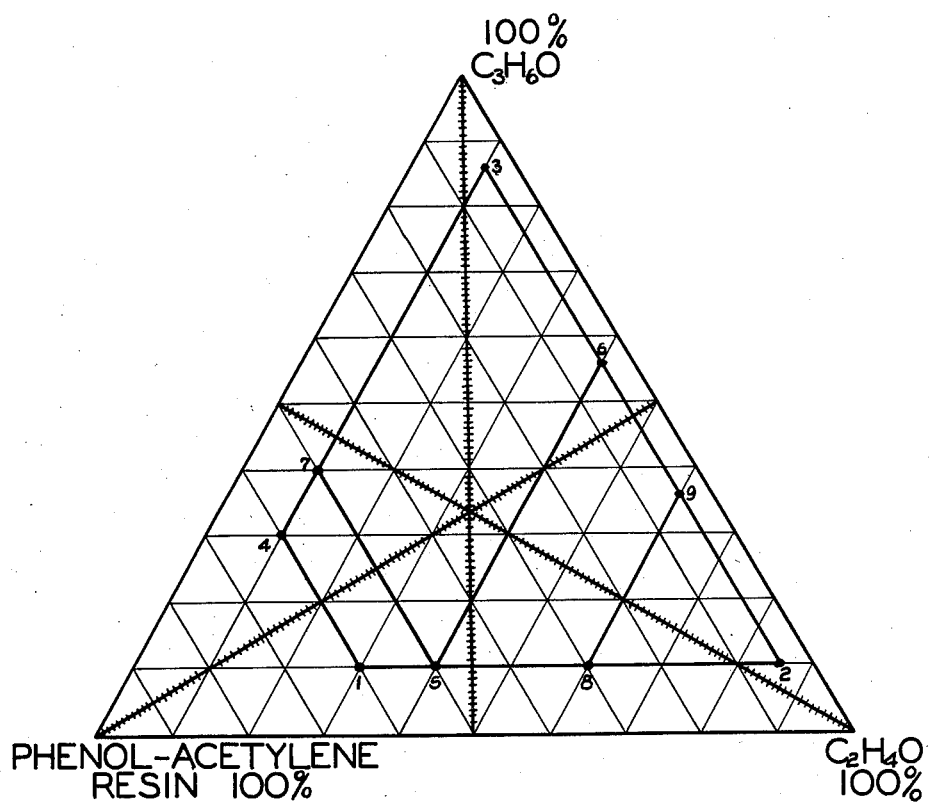

It is convenient to ignore temporarily Figure 3 and pass to Figure 4. Figure 4 again depicts the regular tetrahedron but actually is somewhat distorted, of course. It also shows a space or block within the tetrahedron and since the block is assumed to be somewhat above the base, each and every point in this block represents a 4-component system. The present invention is concerned with those compositions which are characterized and specified by this particular block. As stated previously if 3-dimensional models could be employed all that would be necessary would be to prepare the tetrahedron from sheets of plastic so that 100 sheets, for example, would represent the distance between the base and the apex, cut out the space represented by the block, and fill it in with colored wax or another plastic, and thus the representation would be complete. This is not possible due to limitations which have been pointed out previously.

The composition represented by the block which is really a truncated trapezoidal pyramid is designated by E, F, G, H, I, J, K, and L. Bear in mind that, as has been stated, the base of the truncated pyramid, that is, E, F, G, and H, does not rest on the bottom of the equilateral base triangle. As has been pointed out previously, point D represents 100% glycide. The base triangle represents the three other components and obviously 0% glycide. For purpose of what is said herein, the lower base of the truncated pyramid, E, F, G, H, is a base parallel to the equilateral triangle but two units up, i. e., representing 2% of glycide. Similarly, the upper base of the truncated pyramid, I, J, K, L lies in a plane which is 25 units up from the base, to wit, represents 25% glycide. Specifically, then, this invention is concerned with the use of components in which the glycide component varies from 2% to 25% glycide. The problem then presented is the determination of the other three components, to wit, ethylene oxide, propylene oxide, and the hydrophobic reactant.

A simplification of the problem of characterizing a 4-component system which enters into the spirit of the present invention is this: If the amount of one component is determined or if a range is set, for example, 2% to 25% of glycide, then the difference between this amount and 100%, i. e., 75% to 98%, represents the amounts of percentages of the other three components combined, and these three components recalculated to 100% bases can be determined by use of an ordinary triangular graph, such as employed in our previously mentioned co-pending applications, Serial Nos. 129,709, and 129,710, filed November 28, 1949.

This becomes even simpler by reference to Figure 1 in which it will be assumed that the amount of glycide is within the range of 2% to 25%, and since the base of the tetrahedron is an equilateral triangle the plane parallel to the base and through any point on the perpendicular which represents 2% to 25%, must also be an equilateral triangle.

In Figure 1 from the point A' there are the three conventional perpendiculars to the sides as employed in a 4-component system, i. e., A'B', A'C', A'D'; however, by definition the lines A'B', A'C', and A'D' must be perpendicular to the faces. This means that the angles G'D'A', A'C'F', and A'B'E', are right angles. Similarly, the angles D'G'A', A'E'B', and A'F'C' represent the angles between the faces of a regular tetrahedron and thus are constant. Since two angles of the triangle are the same, the third angle must be the same and it means that these three triangles are similar. This means that the ratio between the perpendiculars to the sides, that is, A'B', A'C', and A'D' bear the same ratio to each other as the perpendiculars to the edges bear to each other to wit, A'E', A'F', and A'G'. Therefore, when the fourth component, for example, glycide, has been set within the range 2% to 25%, the remaining three components consisting of 75% to 98% recalculated back to 100% bases, can be calculated or represented by the same triangular graph as is conventional and as employed in the above mentioned co-pending applications, Serial Nos. 129,709 and 129,710, filed November 28, 1949.

Actually, as far as the limiting points in the truncated pyramid are concerned, which has been previously referred to in Figure 4, it will be noted that in the subsequent test there is a complete table giving the composition of these points for each successive range of glycide. In other words, a perfectly satisfactory repetition is available by means of these tables from a practical standpoint without necessarily resorting to the data of Figure 3.

Figure 3 shows a triangle and the three components other than glycide. These three components added together are less than 100%, to wit, 75% to 98%, but for reasons explained are calculated back to 100%. This point is clarified subsequently by examination of the tables. It will be noted also that in Figure 3 there is shown not only a trapezoid but in essence a trapezoid with a number of additional lines forming other trapezoids or triangles as indicated. The largest trapezoid is 1, 2, 3, 4. Within this tetrahedral area there are compounds whose compositions are indicated approximately by the parallelogram 3, 7, 5, 6. Likewise, another class are indicated by the fact that their compositions fall within the tetrahedral area defined approximately by points 5, 8, 9, 6. See substantially the same presentation as it appears in our co-pending applications, Serial Nos. 129,709 and 129,710, filed November 28, 1949.

Previous reference has been made to our co-pending applications, Serial Nos. 129,709 and 129,710, filed November 28, 1949. As stated, these were concerned with products or co-generic mixtures obtained from three components—an oxyalkylation-susceptible hydrophobic reactant, ethylene oxide and propylene oxide. The present invention contains the fourth component, glycide. At first glance it may seem rather odd that the introduction of glycide in even relatively small amounts radically affects the nature of the resultant products.

Comparing ethylene oxide, propylene oxide, and glycide, it is to be noted that in ethylene oxide the ratio of carbon atoms to oxygen is 2 to 1, in propylene oxide 3 to 1, and in glycide 1.5 to 1. This carbon-oxygen ratio, of course, explains the greater solidifying effect of glycide in comparison with either ethylene oxide or propylene oxide but the principal difference is that in using glycide one can obtain a variety of branched chain or forked structures.

Assume that the hydrophobic oxyalkylation-susceptible reactant has one or more terminal groups which may be indicated thus:

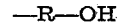

R simply represents a divalent radical. Reaction with ethylene oxide, propylene oxide and glycide may be shown thus:

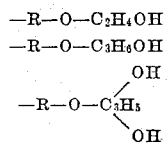

If one employes ethylene oxide first and then glycide, or propylene oxide first and then glycide, one obtains an increased hydrophile effect at the terminal groups for the reason there are two hydroxyls present instead of one, which additionally are susceptible to more complex micellar formation by virtue of association involving two hydroxyls. This is illustrated in the following manner:

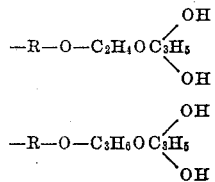

It becomes obvious that glycide can be employed in a number of ways, three of which are as follows: (a) immediately and preceding the introduction of either ethylene oxide or propylene oxide; (b) after ethylene oxide has been introduced and before propylene oxide has been introduced, or vice versa; after propylene oxide has been introduced and before ethylene oxide has been introduced; and finally (c) glycide can be introduced in a terminal position after both ethylene oxide and propylene oxide have been introduced. Needless to say, glycide could be introduced in all three of these positions, or in two of the three. For that matter some ethylene oxide can be introduced, then glycide, and more ethylene oxide, or some propylene oxide, then glycide and more propylene oxide.

Suggestive of such variations are the following formulas:

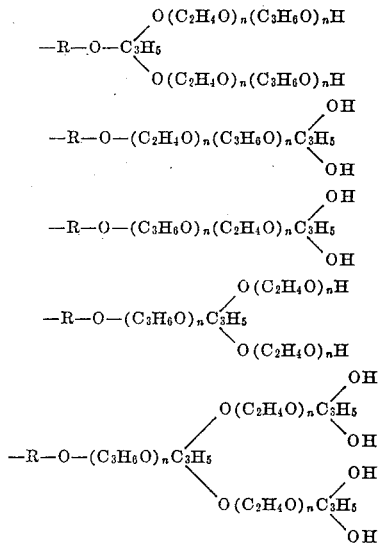

For sake of simplicity it appears advisable to present mixtures obtained from three components first (the oxyalkylation-susceptible hydrophobic reactant, ethylene oxide and propylene oxide) and then carry the three-component system into the four-component system by after-treatment with glycide within the stipulated proportions. After such description it becomes obvious that other modifications of the kind previously suggested readily present themselves and need only minor description. For this reason the subject matter immediately following is in substantially verbatim form as it appears in our co-pending applications, Serial Nos. 129,709 and 129,710, filed November 28, 1949.

PART 2

For a description of useful resins, which include phenol-acetylene resins, phenol-aldehyde acetylene resins and phenol-acetylene aldehyde resins, and the preparation of tertiary-component products prepared from such resins, ethylene oxide and propylene oxide which, when further combined with glycide in proper proportions form compositions useful in the practice of the present invention, reference is made to our Patent 2,574,543 which describes the tertiary-component products and Patent 2,560,333 which describes the resins.

PART 3

As has been pointed out previously, one way of preparing compounds or cogeneric mixtures to be used in the present invention is to prepare a series of compounds such as those indicated by Examples A through I, or more specifically the series identified as XAAl through XFFl, or the series YAAl through YFFl, or the series ZAAl through ZFFl of our Patent 2,574,543.

Having prepared such series all that needs be done thereafter is to treat such oxyalkylated derivatives with glycide so that the precentage of glycide based on the total four-component reaction mass represents 2% to 25% by weight. Such procedure, however, has the obvious limitation that the glycide radical or radicals can appear in the terminal position only.

Referring now to Figure 4 it is obvious that the three components (ignoring glycide) are represented by either the lower trapezoidal base in Figure 4, i. e., E, F, G, H or I, J, K, L and then recalculated to 100% basis as a tertiary mixture; such three components must lie within the trapezoid 1, 2, 3, 4 in Figure 3, and the preferred proportions are within the parallel 3, 7, 5, 6.

Stated another way, if one selects the proportion of three components or reactants (ignoring glycide), and at any stage employs sufficient glycide so that on the basis of the quaternary mixture such glycide represents 2% to 25% of the total by weight, then and in that event one has automatically obtained a composition that is within the limits of the truncated trapezoidal pyramid identified as E, F, G, H—I, J, K, L in Figure 4. This represents the cogeneric mixture or reaction product in terms of initial reactants with the proviso that the glycide content is 2% to 25% by weight, and that the remaining three components recalculated to 100% basis (leaving out glycide for the moment) come within the trapezoidal area indicated by 1, 2, 3, 4 on the triangular graph, to wit, Figure 3.

We have prepared derivatives of the kind herein described in a scale varying from a few hundred grams or less, in the laboratory to hundreds of pounds on a plant scale. In preparing a large number of examples we have found it particularly advantageous to use laboratory equipment which permits continuous oxypropylation and oxyethylation. More specific reference will be made to treatment with glycide, subsequently in the text. The oxyethylation step is, of course, the same as the oxypropylation step insofar that two low boiling liquids are handled in each instance. What immediately follows refers to oxypropylation and it is understood that oxyethylation can be handled conveniently in exactly the same way.

The oxypropylation procedure employed in the preparation of derivatives from polyhydric reactants has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedure.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range; for instance, in most cases we have selected a point of approximately 160° C. to 165° C., as being particularly desirable and stayed within the range of 155° to 180° C. almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the preparation of Example 1a in Part 2, preceding, and offered for sale by numerous laboratory supply houses. If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this part; but in any event, when the initial amount of glycide is added to a suitable reactant, such as a resin, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1d*

It is to be noted that the procedure followed can be conducted on any convenient scale, that is, on either a small laboratory scale, semi-pilot plant scale, pilot plant scale, or large plant scale. We have conducted experiments employing equipment of all such various sizes. Our preference even on a laboratory scale is to use continuous introduction of ethylene and propylene oxide, although this is not necessary. The introduction may be batchwise. Previous reference has been made to the catalyst used in connection with ethylene oxide and propylene oxide. These same alkaline catalysts, particularly caustic soda, caustic potash, sodium methylate, etc., are equally satisfactory with glycide which in many ways seems to be at least as reactive as ethylene oxide and possibly more reactive than propylene oxide.

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M.

The particular piece of equipment employed was adapted for the use of glycide without pressure, as well as the use of ethylene oxide and propylene oxide with pressure. Stated another way, instead of serving as an autoclave only it was also equipped with a water-cooled condenser which could be shut off when used as an autoclave. It was equipped also with an equivalent of a separatory funnel and an equalizing pressure tube so that a liquid such as glycide could be fed continuously at a dropwise or faster rate into the vessel and the rate controlled by visual examination. For convenience, this piece of equipment will be referred to as an autoclave.

12.5 pounds of amylphenol-acetylene resin were dissolved in 12.5 pounds of xylene so as to produce a solution representing 50% of resin by weight. This was charged into the autoclave. There were added approximately 10 ounces (approximately 5% by weight) of ground caustic soda. After being charged the autoclave was sealed, swept with nitrogen, stirring started immediately and heat applied. The temperature was allowed to rise to approximately 118° C.

The glycide employed was comparatively pure. 2.5 pounds of glycide were used. This was charged into the upper reservoir vessel which has been previously flushed out with nitrogen and was the equivalent of a separatory funnel. The glycide was started slowly into the reaction mass in a stream. Reaction started to take place immediately and the temperature rose approximately 11° to 14°. Cooling water was run through the coils so the temperature for addition of glycide was controlled within the range roughly of 112° to 132° C. The addition was continuous within limitations and all the glycide was added in less than 55 minutes. This reaction took place at atmospheric pressure with simply a small stream of nitrogen passing into the autoclave at the very top and passing out the open condenser so as to avoid any possible entrance of air. When the reaction was complete this condenser was shut off and also the opening to the glycide inlet and to the equalizing line. The equipment was used as an autoclave during the addition of propylene oxide and ethylene oxide. In other words, the equipment was operated under pressure. At this point the addition of propylene oxide was started. It was added continuously at such speed that it was absorbed by the reaction as rapidly as possible. The amount of propylene oxide added was 8.4 pounds. The time required to add this propylene oxide was less than one hour. During this time the temperature was maintained at 153° to 162.5° C., using cooling water through the inner coils when necessary, and otherwise applying heat if required. At the end of the addition of propylene oxide there was added ethylene oxide as previously indicated. The amount of ethylene oxide added was 6.5 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was less than an hour.

During the addition of the propylene and ethylene oxides, the pressure was held at approximately 55 pounds per square inch gauge pressure, or less. When all the oxide had been added (ethylene oxide being the final addition in this particular instance) the autoclave was permitted to stay at the same temperature range for another half hour, even longer if required, or until the gauge pressure had been reduced to zero or substantially zero, indicating the reaction was complete. The final product when freed from xylene by vacuum distillation was an oily material, somewhat viscous in nature, resembling castor oil. It was somewhat dispersible in water and also soluble in non-aqueous solvents, such as aromatic hydrocarbons, and others, although not soluble in some non-polar hydrocarbon solvents. The final yield was substantially the total weight of the initial reactants.

*Example 2d*

The same procedure was followed as in Example 1d, preceding, except that the order of addition of the oxides was reversed, the ethylene oxide being added first and the propylene oxide last. The time period, temperature range, pressure, etc., were kept the same as in Example 1d, preceding.

*Example 3d*

The same ratios were used, and the same procedure was followed as in Example 1d, but with the following difference; the equipment was used first as an autoclave to add the propylene oxide. All the propylene oxide was added, the condenser was open to atmospheric pressure, a slow stream of nitrogen was passed through the equipment to prevent air from coming in contact with the reaction mass, and then the same amount of glycide was added as in Example 1d, as the second alkylene oxide reactant instead of the first. When all the glycide had been added in approximately a 2-hour period of time, the connections were changed so that the ethylene oxide was added. The amounts employed, operating conditions, etc., were the same as in Example 1d.

*Example 4d*

The same procedure was followed as in Example 3d, preceding except that the stages of addition of ethylene oxide and propylene oxide were reversed, that is, the ethylene oxide was added as the first stage, using the equipment as an autoclave, then the glycide was added, and then the propylene oxide. The amounts used, operating conditions, etc., were identically the same as in Example 1d, preceding, except for the order of addition.

*Example 5d*

The cogeneric mixture obtained from Example XAA1 of Patent 2,574,543 was treated with 1.3 pounds of glycide in the manner described in Example 1d, preceding. It is to be noted that in essence this is simply another variation of Example 1d, in which the equipment is used as an autoclave, first to add the propylene oxide and then to add the ethylene oxide, and then the glycide when using the equipment with a condenser open to the atmosphere with a slow stream of nitrogen passing through to prevent entrance of air.

*Example 6d*

The product obtained from Example XBB1 of Patent 2,574,543 was treated with 1.1 pounds of glycide in the manner described in Example 1b, preceding. It is to be noted that this example again is simply a variation of Example 1d, in which the ethylene oxide was added first and then the propylene oxide. During these two additions the equipment was used as an autoclave and then the customary change made and glycide added to the extent of 1.1 pounds in the manner described in Example 1d, preceding.

Example 7d

The same procedure was followed as in Example 1d with the following change. After the glycide was added the propylene oxide and ethylene oxide were added as a mixture (14.9 pounds). This mixture of ethylene oxide and propylene oxide was obtained from 8.4 pounds of propylene oxide and 6.5 pounds of ethylene oxide. In this instance, again, the time range, temperature, and pressure were kept substantially the same as in Example 1d, preceding.

Example 8d

The product obtained from Example XCC1 described in Patent 2,574,543 was treated with .9 pound of glycide in the manner previously described under the heading of Example 1d. The procedure employed was that described in Example 5d, preceding.

Example 9d

The examples previously described as Examples 1d, through 8d, inclusive, were repeated making the following change. The amount of catalyst added, instead of being 10 ounces was increased to 11.5 ounces. The amount of glycide used was doubled in each instance. The conditions under which the glycide was added were the same as in previous examples but required slightly longer for addition.

Example 10d

The same procedure was employed as in Examples 1d through 8d, preceding, except that where XAAA1, XBB1 and XCC1 were employed, there were used instead the analogous compounds YAA1, YBB1 and YCC1, previously described in Patent 2,574,543.

Example 11d

The same procedure was employed as in Examples 1d through 8d, preceding, except that where XAA1, XBB1 and XCC1 were employed, there were used instead the analogous compounds ZAA1, ZBB1, and ZCC1, previously described in Patent 2,574,543.

It is to be noted that all the previous examples were prepared from a single resin only, to wit, a tertiary amylphenol formaldehyde resin. Needless to say, the same phenol could have been combined with acetylene and numerous other aldehydes described, or a different phenol could have been used. Under the circumstances it would have been impossible within a reasonable length of time to produce each and every compound herein included and specified as part of the invention. The reasons are obvious. However, we have prepared the equivalent of Example 1b, preceding, in respect to a spot check on a large number of resins and are showing them in the following table. In each instance the amount of glycide varied from 1% to 25% so as to cover the glycide range and the resins employed are indicated in the table. Some additional examples were also prepared, as follows:

| Per Cent Glycide | Amyl Formald. | Butyl Formald. | Octyl Formald. | Nonyl Formald. | Menthyl Formald. | Acetylene After-Treatment ||||| 
|---|---|---|---|---|---|---|---|---|---|---|
|  |  |  |  |  |  | Amylphenol-Acetaldehyde Resin | Butyl Propion-Aldehyde Resin | Octyl Phenol Fufural Resin | Nonyl Phenol Heptaldehyde Resin | Menthyl Butyral Aldehyde Resin |
| 1 | X |  |  |  |  | X |  |  |  |  |
| 2 |  | X |  |  |  |  | X |  |  |  |
| 3 |  |  | X |  |  |  |  | X |  |  |
| 4 |  |  |  | X |  |  |  |  | X |  |
| 5 |  |  |  |  | X |  |  |  |  | X |
| 6 | X |  |  |  |  | X |  |  |  |  |
| 7 |  | X |  |  |  |  | X |  |  |  |
| 8 |  |  | X |  |  |  |  | X |  |  |
| 9 |  |  |  | X |  |  |  |  | X |  |
| 10 |  |  |  |  | X |  |  |  |  | X |
| 11 | X |  |  |  |  | X |  |  |  |  |
| 12 |  | X |  |  |  |  | X |  |  |  |
| 13 |  |  | X |  |  |  |  | X |  |  |
| 14 |  |  |  | X |  |  |  |  | X |  |
| 15 |  |  |  |  | X |  |  |  |  | X |
| 16 | X |  |  |  |  | X |  |  |  |  |
| 17 |  | X |  |  |  |  | X |  |  |  |
| 18 |  |  | X |  |  |  |  | X |  |  |
| 19 |  |  |  | X |  |  |  |  | X |  |
| 20 |  |  |  |  | X |  |  |  |  | X |
| 21 | X |  |  |  |  | X |  |  |  |  |
| 22 |  | X |  |  |  |  | X |  |  |  |
| 23 |  |  | X |  |  |  |  | X |  |  |
| 24 |  |  |  | X |  |  |  |  | X |  |
| 25 |  |  |  |  | X |  |  |  |  | X |

Incidentally, the physical appearance of the materials obtained using glycide in addition to ethylene oxide and propylene oxide is substantially the same as those obtained in which glycide is not used. There is no marked difference in physical appearance and glycide does, of course, add a greater proportion of water solubility. Needless to say, visual examination, or simple physical tests do not reveal the difference in structure pointed out in part 1. These polyglycol ethers are comparatively thin liquids, sometimes showing only modest viscosity, and the color varies from almost water-white to pale amber. The color seems to be due to impurities and is a trace of iron getting into the compound during the process of manufacture, or may be present in the catalyst. The products, of course, show a considerable range of insolubility, from a stage where they are dispersible or miscible, to products which, at least in dilute solution, have an apparently homogeneous or transparent appearance.

PART 4

Referring to Figure 3, it is apparent that although a number of examples have been included, and particular reference is made to Examples A through I, that there is a limit to the numbers which can be included without producing description which becomes burdensome in length. This applies to an even greater degree to the four-component system for the reason that one has included all points within the truncated tetrahedral pyramid depicted in Figure 4 and defined by E, F, G, H—I, J, K, L. However, for convenience, referring to the table which includes Examples A through I in Patent 2,574,543, it is to be noted that the initial mixture includes 6 parts of resin, 3 parts of ethylene oxide, and one part of propylene oxide. This corresponds to point 1 on the chart. In the final example, to wit, Example I, corresponding to point 4 on the chart, there are employed 6 pounds of resin, one pound of ethylene oxide and 3 pounds of propylene oxide. All the signficant 9 points in Figure 3, corresponding to Examples A to I, inclusive in Patent 2,574,543, are shown in the following tables. The table shows the mixture with the three-component constituent (when recalculated back to 100% basis) and the corresponding figure when 1% to 25% glycide is present. The tables are self-explanatory and illustrate compositions which set the boundary or limiting compositions. We have spot checked such compositions and prepared a substantial number but are not including them for the reason that such inclusion would be only repetitious over and above what has been said previously.

*Table A*

TABLE FOR EX. A SERIES—POINT 1 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 60 | 30 | 10 | 59.4 | 29.7 | 9.9 |
| 2 | 98 | 60 | 30 | 10 | 58.8 | 29.4 | 9.8 |
| 3 | 97 | 60 | 30 | 10 | 58.2 | 29.1 | 9.7 |
| 4 | 96 | 60 | 30 | 10 | 57.6 | 28.8 | 9.6 |
| 5 | 95 | 60 | 30 | 10 | 57.0 | 28.5 | 9.5 |
| 6 | 94 | 60 | 30 | 10 | 56.4 | 28.2 | 9.4 |
| 7 | 93 | 60 | 30 | 10 | 55.8 | 27.9 | 9.3 |
| 8 | 92 | 60 | 30 | 10 | 55.2 | 27.6 | 9.2 |
| 9 | 91 | 60 | 30 | 10 | 54.6 | 27.3 | 9.1 |
| 10 | 90 | 60 | 30 | 10 | 54.0 | 27.0 | 9.0 |
| 11 | 89 | 60 | 30 | 10 | 53.4 | 26.7 | 8.9 |
| 12 | 88 | 60 | 30 | 10 | 52.8 | 26.4 | 8.8 |
| 13 | 87 | 60 | 30 | 10 | 52.2 | 26.1 | 8.7 |
| 14 | 86 | 60 | 30 | 10 | 51.6 | 25.8 | 8.6 |
| 15 | 85 | 60 | 30 | 10 | 51.0 | 25.5 | 8.5 |
| 16 | 84 | 60 | 30 | 10 | 50.4 | 25.2 | 8.4 |
| 17 | 83 | 60 | 30 | 10 | 49.8 | 24.9 | 8.3 |
| 18 | 82 | 60 | 30 | 10 | 49.2 | 24.6 | 8.2 |
| 19 | 81 | 60 | 30 | 10 | 48.6 | 24.3 | 8.1 |
| 20 | 80 | 60 | 30 | 10 | 48.0 | 24.0 | 8.0 |
| 21 | 79 | 60 | 30 | 10 | 47.4 | 23.7 | 7.9 |
| 22 | 78 | 60 | 30 | 10 | 46.8 | 23.4 | 7.8 |
| 23 | 77 | 60 | 30 | 10 | 46.2 | 23.1 | 7.7 |
| 24 | 76 | 60 | 30 | 10 | 45.6 | 22.8 | 7.6 |
| 25 | 75 | 60 | 30 | 10 | 45.0 | 22.5 | 7.5 |

*Table B*

TABLE FOR EX. B SERIES—POINT 5 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 50 | 40 | 10 | 49.5 | 39.6 | 9.9 |
| 2 | 98 | 50 | 40 | 10 | 49.0 | 39.2 | 9.8 |
| 3 | 97 | 50 | 40 | 10 | 48.5 | 38.8 | 9.7 |
| 4 | 96 | 50 | 40 | 10 | 48.0 | 38.4 | 9.6 |
| 5 | 95 | 50 | 40 | 10 | 47.5 | 38.0 | 9.5 |
| 6 | 94 | 50 | 40 | 10 | 47.0 | 37.6 | 9.4 |
| 7 | 93 | 50 | 40 | 10 | 46.5 | 37.2 | 9.3 |
| 8 | 92 | 50 | 40 | 10 | 46.0 | 36.8 | 9.2 |
| 9 | 91 | 50 | 40 | 10 | 45.5 | 36.4 | 9.1 |
| 10 | 90 | 50 | 40 | 10 | 45.0 | 36.0 | 9.0 |
| 11 | 89 | 50 | 40 | 10 | 44.5 | 35.6 | 8.9 |
| 12 | 88 | 50 | 40 | 10 | 44.0 | 35.2 | 8.8 |
| 13 | 87 | 50 | 40 | 10 | 43.5 | 34.8 | 8.7 |
| 14 | 86 | 50 | 40 | 10 | 43.0 | 34.4 | 8.6 |
| 15 | 85 | 50 | 40 | 10 | 42.5 | 34.0 | 8.5 |
| 16 | 84 | 50 | 40 | 10 | 42.0 | 33.6 | 8.4 |
| 17 | 83 | 50 | 40 | 10 | 41.5 | 33.2 | 8.3 |
| 18 | 82 | 50 | 40 | 10 | 41.0 | 32.8 | 8.2 |
| 19 | 81 | 50 | 40 | 10 | 40.5 | 32.4 | 8.1 |
| 20 | 80 | 50 | 40 | 10 | 40.0 | 32.0 | 8.0 |
| 21 | 79 | 50 | 40 | 10 | 39.5 | 31.6 | 7.9 |
| 22 | 78 | 50 | 40 | 10 | 39.0 | 31.2 | 7.8 |
| 23 | 77 | 50 | 40 | 10 | 38.5 | 30.8 | 7.7 |
| 24 | 76 | 50 | 40 | 10 | 38.0 | 30.4 | 7.6 |
| 25 | 75 | 50 | 40 | 10 | 37.5 | 30.0 | 7.5 |

Table C

TABLE FOR EX. C SERIES—POINT 8 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 30 | 60 | 10 | 29.7 | 59.4 | 9.9 |
| 2 | 98 | 30 | 60 | 10 | 29.4 | 58.8 | 9.8 |
| 3 | 97 | 30 | 60 | 10 | 29.1 | 58.2 | 9.7 |
| 4 | 96 | 30 | 60 | 10 | 28.8 | 57.6 | 9.6 |
| 5 | 95 | 30 | 60 | 10 | 28.5 | 57.0 | 9.5 |
| 6 | 94 | 30 | 60 | 10 | 28.2 | 56.4 | 9.4 |
| 7 | 93 | 30 | 60 | 10 | 27.9 | 55.8 | 9.3 |
| 8 | 92 | 30 | 60 | 10 | 27.6 | 55.2 | 9.2 |
| 9 | 91 | 30 | 60 | 10 | 27.3 | 54.6 | 9.1 |
| 10 | 90 | 30 | 60 | 10 | 27.0 | 54.0 | 9.0 |
| 11 | 89 | 30 | 60 | 10 | 26.7 | 53.4 | 8.9 |
| 12 | 88 | 30 | 60 | 10 | 26.4 | 52.8 | 8.8 |
| 13 | 87 | 30 | 60 | 10 | 26.1 | 52.2 | 8.7 |
| 14 | 86 | 30 | 60 | 10 | 25.8 | 51.6 | 8.6 |
| 15 | 85 | 30 | 60 | 10 | 25.5 | 51.0 | 8.5 |
| 16 | 84 | 30 | 60 | 10 | 25.2 | 50.4 | 8.4 |
| 17 | 83 | 30 | 60 | 10 | 24.9 | 49.8 | 8.3 |
| 18 | 82 | 30 | 60 | 10 | 24.6 | 49.2 | 8.2 |
| 19 | 81 | 30 | 60 | 10 | 24.3 | 48.6 | 8.1 |
| 20 | 80 | 30 | 60 | 10 | 24.0 | 48.0 | 8.0 |
| 21 | 79 | 30 | 60 | 10 | 23.7 | 47.4 | 7.9 |
| 22 | 78 | 30 | 60 | 10 | 23.4 | 46.8 | 7.8 |
| 23 | 77 | 30 | 60 | 10 | 23.1 | 46.2 | 7.7 |
| 23 | 76 | 30 | 60 | 10 | 22.8 | 45.6 | 7.6 |
| 25 | 75 | 30 | 60 | 10 | 22.5 | 45.0 | 7.5 |

Table D

TABLE FOR EX. D SERIES—POINT 2 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 86 | 10 | 4.0 | 85.1 | 9.9 |
| 2 | 98 | 4 | 86 | 10 | 3.9 | 84.3 | 9.8 |
| 3 | 97 | 4 | 86 | 10 | 3.9 | 83.4 | 9.7 |
| 4 | 96 | 4 | 86 | 10 | 3.8 | 82.6 | 9.6 |
| 5 | 95 | 4 | 86 | 10 | 3.8 | 81.7 | 9.5 |
| 6 | 94 | 4 | 86 | 10 | 3.8 | 80.8 | 9.4 |
| 7 | 93 | 4 | 86 | 10 | 3.7 | 80.0 | 9.3 |
| 8 | 92 | 4 | 86 | 10 | 3.7 | 79.1 | 9.2 |
| 9 | 91 | 4 | 86 | 10 | 3.6 | 78.3 | 9.1 |
| 10 | 90 | 4 | 86 | 10 | 3.6 | 77.4 | 9.0 |
| 11 | 89 | 4 | 86 | 10 | 3.6 | 76.5 | 8.9 |
| 12 | 88 | 4 | 86 | 10 | 3.5 | 75.7 | 8.8 |
| 13 | 87 | 4 | 86 | 10 | 3.5 | 74.8 | 8.7 |
| 14 | 86 | 4 | 86 | 10 | 3.4 | 74.0 | 8.6 |
| 15 | 85 | 4 | 86 | 10 | 3.4 | 73.1 | 8.5 |
| 16 | 84 | 4 | 86 | 10 | 3.4 | 72.2 | 8.4 |
| 17 | 83 | 4 | 86 | 10 | 3.3 | 71.4 | 8.3 |
| 18 | 82 | 4 | 86 | 10 | 3.3 | 70.5 | 8.2 |
| 19 | 81 | 4 | 86 | 10 | 3.2 | 69.7 | 8.1 |
| 20 | 80 | 4 | 86 | 10 | 3.2 | 68.8 | 8.0 |
| 21 | 79 | 4 | 86 | 10 | 3.2 | 67.9 | 7.9 |
| 22 | 78 | 4 | 86 | 10 | 3.1 | 67.1 | 7.8 |
| 23 | 77 | 4 | 86 | 10 | 3.1 | 66.2 | 7.7 |
| 24 | 76 | 4 | 86 | 10 | 3.0 | 65.4 | 7.6 |
| 25 | 75 | 4 | 86 | 10 | 3.0 | 64.5 | 7.5 |

Table E

TABLE FOR EX. E SERIES—POINT 9 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 60 | 36 | 4.0 | 59.4 | 35.6 |
| 2 | 98 | 4 | 60 | 36 | 3.9 | 58.8 | 35.3 |
| 3 | 97 | 4 | 60 | 36 | 3.9 | 58.2 | 34.9 |
| 4 | 96 | 4 | 60 | 36 | 3.8 | 57.6 | 34.6 |
| 5 | 95 | 4 | 60 | 36 | 3.8 | 57.0 | 34.2 |
| 6 | 94 | 4 | 60 | 36 | 3.8 | 56.4 | 33.8 |
| 7 | 93 | 4 | 60 | 36 | 3.7 | 55.8 | 33.5 |
| 8 | 92 | 4 | 60 | 36 | 3.7 | 55.2 | 33.1 |
| 9 | 91 | 4 | 60 | 36 | 3.6 | 54.6 | 32.8 |

Table E—Continued

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 10 | 90 | 4 | 60 | 36 | 3.6 | 54.0 | 32.4 |
| 11 | 89 | 4 | 60 | 36 | 3.6 | 53.4 | 32.0 |
| 12 | 88 | 4 | 60 | 36 | 3.5 | 52.8 | 31.7 |
| 13 | 87 | 4 | 60 | 36 | 3.5 | 52.2 | 31.3 |
| 14 | 86 | 4 | 60 | 36 | 3.4 | 51.6 | 31.0 |
| 15 | 85 | 4 | 60 | 36 | 3.4 | 51.0 | 30.6 |
| 16 | 84 | 4 | 60 | 36 | 3.4 | 50.4 | 30.2 |
| 17 | 83 | 4 | 60 | 36 | 3.3 | 49.8 | 29.9 |
| 18 | 82 | 4 | 60 | 36 | 3.3 | 49.2 | 29.5 |
| 19 | 81 | 4 | 60 | 36 | 3.2 | 48.6 | 29.2 |
| 20 | 80 | 4 | 60 | 36 | 3.2 | 48.0 | 28.8 |
| 21 | 79 | 4 | 60 | 36 | 3.2 | 47.4 | 28.4 |
| 22 | 78 | 4 | 60 | 36 | 3.1 | 46.8 | 28.1 |
| 23 | 77 | 4 | 60 | 36 | 3.1 | 46.2 | 27.7 |
| 24 | 76 | 4 | 60 | 36 | 3.0 | 45.6 | 27.4 |
| 25 | 75 | 4 | 60 | 36 | 3.0 | 45.0 | 27.0 |

Table F

TABLE FOR EX. F SERIES—POINT 6 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 40 | 56 | 4.0 | 39.6 | 55.4 |
| 2 | 98 | 4 | 40 | 56 | 3.9 | 39.2 | 54.9 |
| 3 | 97 | 4 | 40 | 56 | 3.9 | 38.8 | 54.3 |
| 4 | 96 | 4 | 40 | 56 | 3.8 | 38.4 | 53.8 |
| 5 | 95 | 4 | 40 | 56 | 3.8 | 38.0 | 53.2 |
| 6 | 94 | 4 | 40 | 56 | 3.8 | 37.6 | 52.6 |
| 7 | 93 | 4 | 40 | 56 | 3.7 | 37.2 | 52.1 |
| 8 | 92 | 4 | 40 | 56 | 3.7 | 36.8 | 51.5 |
| 9 | 91 | 4 | 40 | 56 | 3.6 | 36.4 | 51.0 |
| 10 | 90 | 4 | 40 | 56 | 3.6 | 36.0 | 50.4 |
| 11 | 89 | 4 | 40 | 56 | 3.6 | 35.6 | 49.8 |
| 12 | 88 | 4 | 40 | 56 | 3.5 | 35.2 | 49.3 |
| 13 | 87 | 4 | 40 | 56 | 3.5 | 34.8 | 48.7 |
| 14 | 86 | 4 | 40 | 56 | 3.4 | 34.4 | 48.2 |
| 15 | 85 | 4 | 40 | 56 | 3.4 | 34.0 | 47.6 |
| 16 | 84 | 4 | 40 | 56 | 3.4 | 33.6 | 47.0 |
| 17 | 83 | 4 | 40 | 56 | 3.3 | 33.2 | 46.5 |
| 18 | 82 | 4 | 40 | 56 | 3.3 | 32.8 | 45.9 |
| 19 | 81 | 4 | 40 | 56 | 3.2 | 32.4 | 45.4 |
| 20 | 80 | 4 | 40 | 56 | 3.2 | 32.0 | 44.8 |
| 21 | 79 | 4 | 40 | 56 | 3.2 | 31.6 | 44.2 |
| 22 | 78 | 4 | 40 | 56 | 3.1 | 31.2 | 43.7 |
| 23 | 77 | 4 | 40 | 56 | 3.1 | 30.8 | 43.1 |
| 24 | 76 | 4 | 40 | 56 | 3.0 | 30.4 | 42.6 |
| 25 | 75 | 4 | 40 | 56 | 3.0 | 30.0 | 42.0 |

Table G

TABLE FOR EX. G SERIES—POINT 3 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 10 | 86 | 4.0 | 9.9 | 85.1 |
| 2 | 98 | 4 | 10 | 86 | 3.9 | 9.8 | 84.3 |
| 3 | 97 | 4 | 10 | 86 | 3.9 | 9.7 | 83.4 |
| 4 | 96 | 4 | 10 | 86 | 3.8 | 9.6 | 82.6 |
| 5 | 95 | 4 | 10 | 86 | 3.8 | 9.5 | 81.7 |
| 6 | 94 | 4 | 10 | 86 | 3.8 | 9.4 | 80.8 |
| 7 | 93 | 4 | 10 | 86 | 3.7 | 9.3 | 80.0 |
| 8 | 92 | 4 | 10 | 86 | 3.7 | 9.2 | 79.1 |
| 9 | 91 | 4 | 10 | 86 | 3.6 | 9.1 | 78.3 |
| 10 | 90 | 4 | 10 | 86 | 3.6 | 9.0 | 77.4 |
| 11 | 89 | 4 | 10 | 86 | 3.6 | 8.9 | 76.5 |
| 12 | 88 | 4 | 10 | 86 | 3.5 | 8.8 | 75.7 |
| 13 | 87 | 4 | 10 | 86 | 3.5 | 8.7 | 74.8 |
| 14 | 86 | 4 | 10 | 86 | 3.4 | 8.6 | 74.0 |
| 15 | 85 | 4 | 10 | 86 | 3.4 | 8.5 | 73.1 |
| 16 | 84 | 4 | 10 | 86 | 3.4 | 8.4 | 72.2 |
| 17 | 83 | 4 | 10 | 86 | 3.3 | 8.3 | 71.4 |
| 18 | 82 | 4 | 10 | 86 | 3.3 | 8.2 | 70.5 |
| 19 | 81 | 4 | 10 | 86 | 3.2 | 8.1 | 69.7 |
| 20 | 80 | 4 | 10 | 86 | 3.2 | 8.0 | 68.8 |
| 21 | 79 | 4 | 10 | 86 | 3.2 | 7.9 | 67.9 |
| 22 | 78 | 4 | 10 | 86 | 3.1 | 7.8 | 67.1 |
| 23 | 77 | 4 | 10 | 86 | 3.1 | 7.7 | 66.2 |
| 24 | 76 | 4 | 10 | 86 | 3.0 | 7.6 | 65.4 |
| 25 | 75 | 4 | 10 | 86 | 3.0 | 7.5 | 64.5 |

*Table H*

TABLE FOR EX. H SERIES—POINT 7 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 50 | 10 | 40 | 49.5 | 9.9 | 39.6 |
| 2 | 98 | 50 | 10 | 40 | 49.0 | 9.8 | 39.2 |
| 3 | 97 | 50 | 10 | 40 | 48.5 | 9.7 | 39.8 |
| 4 | 96 | 50 | 10 | 40 | 48.0 | 9.6 | 38.4 |
| 5 | 95 | 50 | 10 | 40 | 47.5 | 9.5 | 38.0 |
| 6 | 94 | 50 | 10 | 40 | 47.0 | 9.4 | 37.6 |
| 7 | 93 | 50 | 10 | 40 | 46.5 | 9.3 | 37.2 |
| 8 | 92 | 50 | 10 | 40 | 46.0 | 9.2 | 36.8 |
| 9 | 91 | 50 | 10 | 40 | 45.5 | 9.1 | 36.4 |
| 10 | 90 | 50 | 10 | 40 | 45.0 | 9.0 | 36.0 |
| 11 | 89 | 50 | 10 | 40 | 44.5 | 8.9 | 35.6 |
| 12 | 88 | 50 | 10 | 40 | 44.0 | 8.8 | 35.2 |
| 13 | 87 | 50 | 10 | 40 | 43.5 | 8.7 | 34.8 |
| 14 | 86 | 50 | 10 | 40 | 43.0 | 8.6 | 34.4 |
| 15 | 85 | 50 | 10 | 40 | 42.5 | 8.5 | 34.0 |
| 16 | 84 | 50 | 10 | 40 | 42.0 | 8.4 | 33.6 |
| 17 | 83 | 50 | 10 | 40 | 41.5 | 8.3 | 33.2 |
| 18 | 82 | 50 | 10 | 40 | 41.0 | 8.2 | 32.8 |
| 19 | 81 | 50 | 10 | 40 | 40.5 | 8.1 | 32.4 |
| 20 | 80 | 50 | 10 | 40 | 40.0 | 8.0 | 32.0 |
| 21 | 79 | 50 | 10 | 40 | 39.5 | 7.9 | 31.6 |
| 22 | 78 | 50 | 10 | 40 | 39.0 | 7.8 | 31.2 |
| 23 | 77 | 50 | 10 | 40 | 38.5 | 7.7 | 30.8 |
| 24 | 76 | 50 | 10 | 40 | 38.0 | 7.6 | 30.4 |
| 25 | 75 | 50 | 10 | 40 | 37.5 | 7.5 | 30.0 |

*Table I*

TABLE FOR EX. I SERIES—POINT 4 ON TRIANGULAR GRAPH—(FIGURE 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 60 | 10 | 30 | 59.4 | 9.9 | 29.7 |
| 2 | 98 | 60 | 10 | 30 | 58.8 | 9.8 | 29.4 |
| 3 | 97 | 60 | 10 | 30 | 58.2 | 9.7 | 29.1 |
| 4 | 96 | 60 | 10 | 30 | 57.6 | 9.6 | 28.8 |
| 5 | 95 | 60 | 10 | 30 | 57.0 | 9.5 | 28.5 |
| 6 | 94 | 60 | 10 | 30 | 56.4 | 9.4 | 28.2 |
| 7 | 93 | 60 | 10 | 30 | 55.8 | 9.3 | 29.9 |
| 8 | 92 | 60 | 10 | 30 | 55.2 | 9.2 | 27.6 |
| 9 | 91 | 60 | 10 | 30 | 54.6 | 9.1 | 27.3 |
| 10 | 90 | 60 | 10 | 30 | 54.0 | 9.0 | 27.0 |
| 11 | 89 | 60 | 10 | 30 | 53.4 | 8.9 | 26.7 |
| 12 | 88 | 60 | 10 | 30 | 52.8 | 8.8 | 26.4 |
| 13 | 87 | 60 | 10 | 30 | 52.2 | 8.7 | 26.1 |
| 14 | 86 | 60 | 10 | 30 | 51.6 | 8.6 | 25.8 |
| 15 | 85 | 60 | 10 | 30 | 51.0 | 8.5 | 25.5 |
| 16 | 84 | 60 | 10 | 30 | 50.4 | 8.4 | 25.2 |
| 17 | 83 | 60 | 10 | 30 | 49.8 | 8.3 | 24.9 |
| 18 | 82 | 60 | 10 | 30 | 49.2 | 8.2 | 24.6 |
| 19 | 81 | 60 | 10 | 30 | 48.6 | 8.1 | 24.3 |
| 20 | 80 | 60 | 10 | 30 | 48.0 | 8.0 | 24.0 |
| 21 | 79 | 60 | 10 | 30 | 47.4 | 7.9 | 23.7 |
| 22 | 78 | 60 | 10 | 30 | 46.8 | 7.8 | 23.4 |
| 23 | 77 | 60 | 10 | 30 | 46.2 | 7.7 | 23.1 |
| 24 | 76 | 60 | 10 | 30 | 45.6 | 7.6 | 22.8 |
| 25 | 75 | 60 | 10 | 30 | 45.0 | 7.5 | 22.5 |

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000 or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, i. e., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass. The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1d, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 1d, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described our invention, what we claim as new and desire to secure by Letters Patent, is:

1. A process for breaking petroleum emulsions of the water-in-oil type characterized by subjecting the emulsion to the action of a demulsifier including a cogeneric mixture of a homologous series of glycol ethers of phenol-acetylene resins; said cogeneric mixture being derived exclusively from oxyalkylation-susceptible, fusible, organic solvent-soluble, water-insoluble, phenol-acetylene resins, glycide, ethylene oxide and propylene oxide in such weight proportions so the average composition of said cogeneric mixture stated in terms of initial reactants lies approximately within the truncated trapezoidal pyramid identfiied as E, F, G, H—I, J, K, L in Figure 4, with the proviso that the percentage of glycide is within the limits of 2% to 25% by weight and that the remaining three initial reactants, recalculated to a 100% basis, lie approximately within the trapezoidal area defined approximately in Figure 3 by points 1, 2, 3 and 4; said resin being derived at least in part by reaction with an acetylenic hydrocarbon so as to introduce an alternate acetylenic radical as the linking structure between phenolic nuclei.

2. A process for breaking petroleum emulsions of the water-in-oil type characterized by subjecting the emulsion to the action of a demulsifier including a cogeneric mixture of a homologous series of glycol ethers of phenol-acetylene resins; said cogeneric mixture being derived exclusively from oxylkylation-susceptible, fusible, organic solvent-soluble, water-insoluble, phenol-acetylene resins, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the parallelogram defined approximately in Figure 3 by points 5, 6, 3 and 7; said resin being derived at least in part by reaction with an acetylenic hydrocarbon so as to introduce an alternate acetylenic radical as the linking structure between phenolic nuclei; and with the proviso that the hydrophile properties of said oxyalkylated resin in an equal weight of xylene are sufficient to produce an emulsion when said xylene solution is shaken vigorously with one to three volumes of water.

3. A process for breaking petroleum emulsions of the water-in-oil type characterized by subjecting the emulsion to the action of a demulsifier including a cogeneric mixture of a homologous series of glycol ethers of phenol-acetylene resins; said cogeneric mixture being derived exclusively from oxyalkylation-susceptible, fusible, organic solvent-soluble, water-insoluble, phenol-acetylene resins, glycide, ethylene oxide and propylene oxide in such weight proportions so the average compositions of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the parallelogram defined approximately in Figure 3 by points 5, 6, 3 and 7; said resin being derived at least in part by reaction with acetylene so as to introduce an alternate acetylene radical as the linking structure between phenolic nuclei; and with the proviso that the hydrophile properties of said oxyalkylated resin in an equal weight of xylene are sufficient to produce an emulsion when said xylene solution is shaken vigorously with one to three volumes of water.

4. The process of claim 3 wherein the resin is obtained from acetylene and a phenol in absence of an aldehyde.

5. The process of claim 3 wherein the resin is an acetylene-treated phenol-aldehyde resin.

6. The process of claim 3 wherein the resin is an aldehyde after-treated phenol-acetylene resin.

MELVIN DE GROOTE.
BERNHARD KEISER.

REFERENCES CITED

The following references are of record in the file of this patent:

UNITED STATES PATENTS

| Number | Name | Date |
|---|---|---|
| 2,040,212 | Orthner | May 12, 1936 |
| 2,076,624 | De Groote | Apr. 13, 1937 |
| 2,454,541 | Bock et al. | Nov. 23, 1948 |